(12) United States Patent
Veeneman

(10) Patent No.: US 8,386,305 B1
(45) Date of Patent: Feb. 26, 2013

(54) METHOD FOR ESTABLISHING AND PROMOTING A GIFT REGISTRY

(75) Inventor: William J Veeneman, Minneapolis, MN (US)

(73) Assignee: AMS, Inc., Minneapolis, MN (US)

( * ) Notice: Subject to any disclaimer, the term of this patent is extended or adjusted under 35 U.S.C. 154(b) by 1763 days.

(21) Appl. No.: 11/425,597

(22) Filed: Jun. 21, 2006

Related U.S. Application Data

(60) Provisional application No. 60/692,552, filed on Jun. 21, 2005.

(51) Int. Cl.
*G06Q 30/00* (2012.01)
(52) U.S. Cl. .................. 705/14.1; 705/14.36; 705/14.56
(58) Field of Classification Search ........................ None
See application file for complete search history.

(56) References Cited

U.S. PATENT DOCUMENTS

| | | | |
|---|---|---|---|
| 2002/0069108 A1* | 6/2002 | Aubertin et al. | 705/14 |
| 2005/0033644 A1* | 2/2005 | Veeneman et al. | 705/14 |
| 2006/0041435 A1* | 2/2006 | Knorr | 705/1 |

OTHER PUBLICATIONS

Belk Launches E-Commerce WEbsite Featuring New Online Gift Registry for Bridal Customers. Jan. 18, 2001. PR Newswire. pp. 1-4.*

* cited by examiner

*Primary Examiner* — Matthew T Sittner
(74) *Attorney, Agent, or Firm* — Haugen Law Firm PLLP

(57) ABSTRACT

A method for promoting an electronic database-driven gift registry includes issuing one or more database access keys to an organization having one or more members, and providing an incentive for the one or more members to register with the gift registry by initializing respective of the database access keys with a database associated with the gift registry. The method further includes awarding a first award to the one or more members who register with a gift registry, and awarding a second award to the organization for each of the one or more members who register with the gift registry.

16 Claims, 1 Drawing Sheet

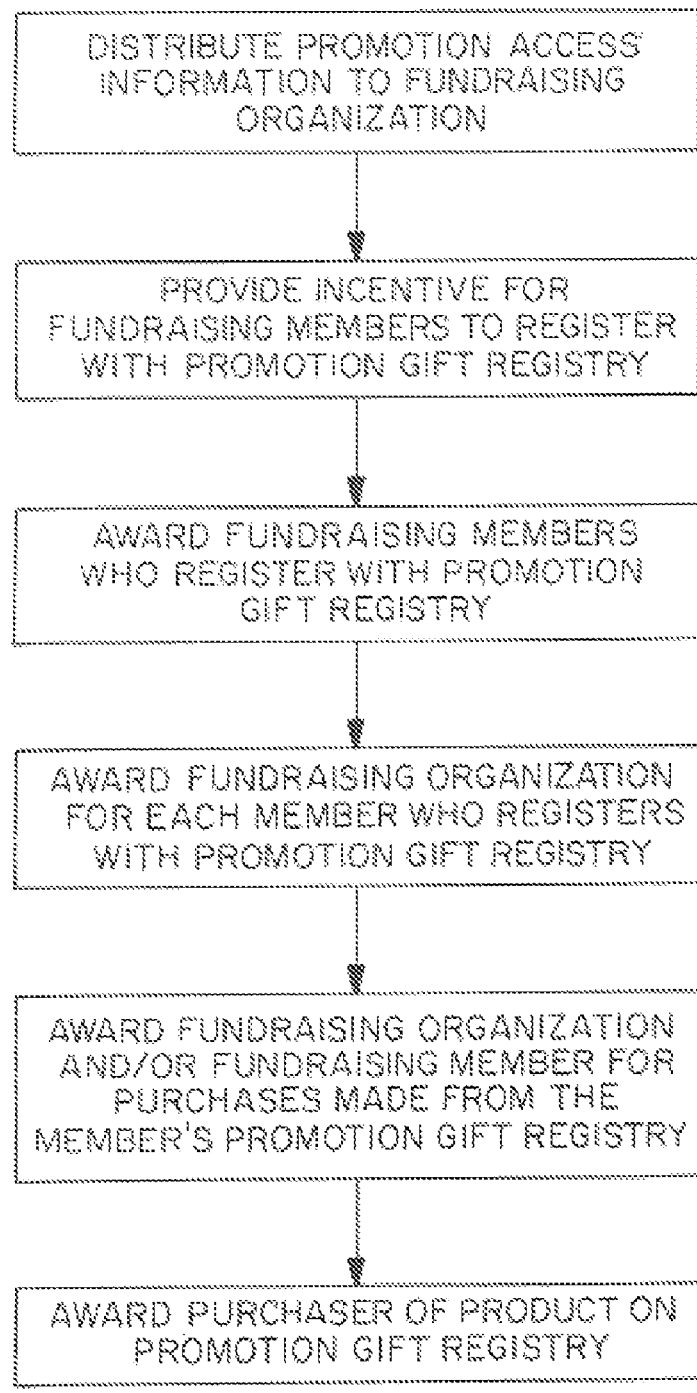

METHOD FOR ESTABLISHING AND PROMOTING A GIFT REGISTRY

CROSS-REFERENCE TO RELATED APPLICATION

This application claims priority from U.S. provisional application Ser. No. 60/692,552, filed on Jun. 21, 2005 and entitled "METHOD FOR ESTABLISHING AND PROMOTING A GIFT REGISTRY", the content of which is incorporated herein in its entirety.

FIELD OF THE INVENTION

The present invention relates to gift registries generally, and more particularly to a method for establishing and promoting a gift registry as a vehicle for fundraising efforts, as well as a marketing method using gift registries.

BACKGROUND OF THE INVENTION

A variety of fundraising techniques have been developed for encouraging the donation of money, time and/or services to a charitable cause. One fundraising method that has been widely used in, for example, fundraising efforts for school programs, has enlisted direct product sales efforts by school children, typically with a percentage of the sales being given to the fundraising organization, and the remaining portion to the sponsoring product merchants.

While such conventional fundraising efforts have generated modest success in the past, direct sales techniques are becoming decreasingly popular for a host of reasons. For example, several states have enacted legislation limiting the type and volume of products being sold by school children. Other states have prohibited students from participating in school fund raisers that offer incentives, prizes, or awards based on the amount of money raised. In addition, concerns have been raised regarding the safety of promoting door-to-door sales by school children. Moreover, typical direct sales approaches inspire a relatively small proportion of the members of the fundraising organization to actually conduct direct sales efforts.

As indicated above, existing fundraising techniques rely greatly upon the ability of the technique to encourage participation by the individuals conducting the fundraising efforts. In most conventional fundraising programs, the fundraising member must seek out and solicit third parties as potential donors or product purchasers, with many of such third parties potentially being previously unknown to the fundraising member. Such third party contact can often be a sufficient hurdle that minimizes potential charitable donations.

In addition, there exists a need for obtaining targeted marketing information on certain consumers. Such targeted marketing information greatly assists merchants in focusing marketing resources to only interested sets of consumers. At present, however, it is difficult to solicit such information from consumers, and particularly solicit such information in connection with particular goods that the respective consumer is interested in.

It is therefore a principle object of the present invention to provide a fundraising program that minimizes barriers to participation by fundraising organization members.

It is a further object of the present invention to provide a promotional program that provides incentives to consumers to register for one or more gift registries in exchange for certain personal and/or consumer preference information.

It is a further object of the present invention to provide a fundraising program that eliminates the need for direct sales to be performed by the fundraising organization members.

It is a still further object of the present invention to provide a fundraising program that maintains the privacy of fundraising organization member identities, at least until such members voluntarily participate in the fundraising program.

It is another object of the present invention to provide a fundraising program that automatically builds a database of information for marketing use by the respective merchants participating in the fundraising program.

It is a still further object of the present invention to provide a fundraising program that introduces and encourages the use of gift registries operated by the respective merchants participating in the fundraising program.

SUMMARY OF THE INVENTION

By means of the present invention, gift registries of one or more merchants may be effectively marketed while simultaneously generating revenue for a fundraising organization. Accordingly, the method of the present invention enables a fundraising scheme that eliminates the need for direct sales efforts between members of the fundraising organization and third parties, while also providing long-term beneficial marketing effects for the merchants sponsoring such fundraising activities. The fundraising and gift registry marketing program of the present invention minimizes the current barriers which exist in conventional fundraising schemes, and encourages behavior that benefits each of the fundraising organization, the members of the fundraising organization, and the merchants sponsoring the fundraising program.

In a particular embodiment, the method for promoting an electronic database-driven gift registry includes issuing one or more database access keys to an organization having one or more members. An incentive is then provided for the members to register with the gift registry by initializing respective ones of the database access keys with an electronic database associated with the gift registry. Such incentive is preferably in the form of a first award that is awarded to each of the members who register with the gift registry, while a second award is awarded to the organization for each of the respective members who register with the gift registry.

In another embodiment, a fundraising method is provided, which includes issuing one or more database access keys to an organization having one or more members, and providing an incentive for the members to register with a gift registry, which registration is accomplished by initializing respective ones of the database access keys with a database associated with the gift registry. The fundraising method further provides awarding a first award to the organization for each of the one or more members who register with the gift registry.

BRIEF DESCRIPTION OF THE DRAWINGS

FIG. 1 is a flow diagram of the method of the present invention.

DETAILED DESCRIPTION OF THE PREFERRED EMBODIMENTS

The objects and advantages enumerated above together with other objects, features, and advances represented by the present invention will now be presented in terms of detailed embodiments which are intended to be representative of various possible embodiments of the invention. Other embodiments and aspects of the invention are recognized as being within the grasp of those having ordinary skill in the art.

The method of the present invention provides for a unique fundraising program that encourages widespread participation by members of the fundraising organization through easy to reach incentives. Moreover, the fundraising program of the present invention eliminates the need for direct sales efforts by the members of the fundraising organization.

A particular embodiment of the present invention is illustrated in the flow diagram of FIG. 1, wherein a given fundraising project is initiated by distributing one or more trackable gift registry identification cards, gift cards, loyalty cards, or other informational media to the fundraising organization, and ultimately to the individual members of the fundraising organization. Such identification cards, codes, or other informational media is generally referred to herein as database access keys. The gift registry identification cards preferably represent one or more merchant's gift registries, and provide a link to such automated gift registries. A particular example of trackable gift registry identification cards contemplated for use in the method of the present invention is described in our co-pending U.S. Provisional Patent Application Ser. No. 60/614,296, entitled "A System and Method of Gift Registry", which was filed on Sep. 29, 2004, the contents of which are herein incorporated by reference.

In some embodiments, the fundraising project is initiated by distributing a database access key in the form of an organizational access code through which all members of the fundraising organization may participate. In such embodiments, individual identification cards are not necessary to initiate the fundraising process. Instead, the members of the fundraising organization are merely required to utilize the organizational code issued by the sponsoring merchants to individually register by providing certain identifying information. Once such registration is completed, the Registrant is provided with a unique identification code for subsequent individual use. Registration using the organizational code may be accomplished either at the one or more sponsor merchant locations, or remotely through a computer network communicatively coupled to one or more databases associated with the participating merchants.

Registrations utilizing a gift registry identification card may be accomplished in a similar manner as that described above with respect to the organizational fundraising code, or instead may involve optically reading a bar code, electronically reading a magnetic pattern or radio frequency identification signal, or other machine-detectable patterns on the identification card at, for example, the physical location of the merchant. Other locations for discerning an identifying pattern disposed on the identification card, and transmitting the corresponding information electronically to a database are contemplated by the present invention. The detection or input and subsequent transmission of the identifying information to a respective gift registry database initializes the identifying information with such database, and enables the creation of an individual member registry unique to each user, and/or the association of a number of different registries to the respective user.

Each mode of gift registry identification carries with it an incentive for the member to register with the one or more merchants' gift registries utilizing a unique registrant identification number and optionally a unique password provided to the member through, for example, the gift registry identification card or a response to the user's entry of the organization code into one or more associated databases. As such, each fundraising member of the fundraising organization earns an incentive to register on the one or more gift registries represented in the promotion by utilizing the provided registration information. In some embodiments, the registration information is a unique set of data provided to each member prior to the registration process. In other embodiments, such unique user information is provided subsequent to the input by the fundraising organization member of the organizational code to the respective merchant database(s).

In preferred embodiments, a monetary incentive is provided to the fundraising members for such registration. Other incentives, such as pre-defined gifts or discounts, may in addition or instead be provided as incentives to register with the associated gift registries. The incentives may be automatically added to the fundraising member's gift card, if any such gift card exists, sent to the fundraising organization, and/or sent to the member through other techniques.

As described in detail in U.S. Patent Application Ser. No. 60/614,296, registration with the associated gift registries involves the input of certain registrant information, such as demographic and mailing address information. Registration may be accomplished, for example, through a computer network accessing the corresponding online gift registries from various computer terminals, including terminals located at a user's home or within a respective merchant's retail location, and/or by telephoning customer service representatives of the merchants.

In some embodiments, a welcome kit including a permanent gift registry card, gift card, and/or other promotional items may be sent on behalf of the respective merchants to each fundraising member upon registration in gift registries associated with such merchants. Further included in the welcome kit may be an award of the monetary incentive offered to the registering fundraising members, with such a monetary award being in the form of, for example, a pre-paid gift card redeemable with the respective merchants represented in the temporary gift registry identification card. In other embodiments, however, such a monetary award may be provided instantly upon registration, such as in the form of a printable coupon or electronically added to a respective gift card account.

The incentive to fundraising members may further be requisite upon the fundraising members to both register with the respective gift registries and to select products desired for purchase at the respective merchant utilizing one of a variety of selection mechanisms. A preferred mode of product selection is through the use of a portable scanning device having optical sensing means and memory means for selectively recording the products desired for purchase by optically observing a coded tag or pattern affixed to the respective products at the respective merchant's retail outlet. Such a selection technique is further described in U.S. Patent Application Ser. No. 60/614,296. Other product selection mechanisms may be alternatively utilized, such as through on-line connection to a merchant website.

In some embodiments, however, the incentive provided for fundraising members is solely for registering with the associated gift registries, while a further incentive may optionally be provided to the fundraising members to enter selections into the respective gift registries, such as through one or more of the product selection techniques described above. Moreover, another optional incentive may be provided to purchase selected products from the gift registry created through the fundraising program of the present invention.

A fundraising award or recognition from the sponsoring merchants is preferably provided to the fundraising organization for each fundraising member who registers for the gift registries utilizing, for example, the respective temporary gift registry identification cards. The award may preferably be monetary, but other forms of awards to the fundraising organization are contemplated by the present invention, including equipment and/or name recognition on certain publications such as computer network-based publications. The award to the fundraising organization may instead or additionally be tied into each fundraising member who both registers with the respective gift registries through the coded registration information described above, and selects products for purchase on such gift registries through an appropriate product selection technique.

In some embodiments of the invention, an additional benefit may be awarded from the respective sponsoring merchants to the fundraising organization for each fundraising member having an item purchased from their individual member registry established through the fundraising program of the present invention. A fundraising member qualifies the fundraising organization for an award by registering on a respective gift registry and creating a personal registry by selecting one or more products for purchase from the corresponding sponsoring merchant through a selection technique that automatically uploads the member's selection to the gift registry database. When one of the selected products for purchase are in fact purchased through the fundraising member's associated individual gift registry, the sponsoring gift registry merchant is able to track such a transaction, and preferably generate a pre-determined award to the fundraising organization. The sponsoring gift registry merchant may further award the gift purchaser with an award, such as a percentage discount off the product price purchased from the gift registry, or for future product purchases.

In some embodiments of the present invention, a gift registration identification card issued to each fundraising organization member, either upon registration in one or more participating gift registries, or prior thereto, may further have the capacity of acting as a gift card, wherein unique codes, such as optically-readable bar codes, electronically readable magnetic codes, radio frequency identification signals, or the like, may enable electronic access to the card holder's account with such merchants. In such a manner, the gift registry card may be used not only to access an individual member gift registry established by the card holder, but may also be utilized to manipulate a card holder's account with one or more participating merchants. In addition, the gift registry card/gift card may, in some embodiments, be universal among a plurality of participating merchants. Accordingly, a single card holder's identification code may be utilized to access one or more card holder accounts at a plurality of participating merchants.

In some cases, certain participating merchants may possess gift registry or other electronic account systems that are not immediately compatible with the electronic identification codes issued to the fundraising organization members through the respective database access keys. In such situations, the fundraising program operator may establish and maintain an electronic conversion protocol that permits registration by a fundraising organization member with a non-compliant participating merchant's database, and communication to such merchant's database utilizing the member's database access key. To do so, the conversion protocol effectively "translates" the non-compliant merchant's identification code to the appropriate fundraising member's database access key. Accordingly, the identification and registration system of the present invention does not require modification of participating merchants' electronic account identification protocols.

The fundraising program of the present invention therefore removes the need for fundraising members to conduct direct sales efforts, and simultaneously minimizes barriers to participation by such fundraising members. In order to receive an award from the merchant or merchants sponsoring the fundraising program, the fundraising member need only register with the associated gift registries by utilizing the registration information provided to such member, for example, through a fundraising organizational code or a gift registry identification card. An incentive is provided to further explore the gift registry program by making product or purchase selection on the gift registry through an automated database-connected means, such as a scanning device or on-line selection. Since the money or other award received by the fundraising organization is based upon the participation of its fundraising members, a further incentive to register with the respective gift registries is provided.

The fundraising program of the present invention further provides significant benefits to the sponsoring merchants, in that awareness and traffic to the sponsoring merchant's gift registries and retail outlets are substantially increased. The fundraising programs further provide a marketing channel to targeted age groups and/or interested market audiences. Moreover, the program automatically obtains key marketing information on registrants. Such marketing information may include fundraising member demographic information, as well as product preferences for future focused marketing efforts.

The invention has been described herein in considerable detail in order to comply with the patent statutes, and to provide those skilled in the art with the information needed to apply the novel principals and to use embodiments of the invention as required. However, it is to be understood that the invention can be carried out by specifically different devices and that various modifications can be accomplished without departing from the scope of the invention itself.

What is claimed is:

1. A method for promoting an electronic database-driven gift registry, said method comprising:
   (a) providing a computer processor, a database having one or more merchant gift registries, and a computer terminal communicatively linked to said computer processor and said database;
   (b) issuing one or more database access keys to an organization having one or more members;
   (c) providing an incentive for said one or more members to register with said one or more merchant gift registries by initializing respective said database access keys with said database associated with said gift registry;
   (d) receiving at said database from said one or more members a registration instruction in a computer readable medium, said registration instruction being processed by said computer processor to initialize a respective said access key and to thereby record member identifying registration information at said database in connection with said merchant gift registry;
   (e) awarding a first award to said one or more members upon registration with said merchant gift registry; and
   (f) awarding a second award to said organization upon registration with at least one of said one or more merchant gift registries by at least one of said members.

2. A method as in claim 1 wherein initializing respective said database access keys creates an individual member registry for each registering member, said individual member registry being interfaceable with said one or more merchant gift registries.

3. A method as in claim 2 wherein said one or more members select and enter one or more products into a respective said individual member registry.

4. A method as in claim 3 wherein selecting and entering one or more products into said individual member registry is accomplished by a technique selected from the group consisting of scanning respective optical product identifier patterns, electronically selecting a product from an associated merchant's website, and combinations thereof.

5. A method as in claim 3, including awarding a third award to a recipient upon a purchase of at least one of said products of said individual member registry for said respective member, said recipient being selected from the group consisting of said member, said organization, and combinations thereof.

6. A method as in claim 5, including awarding a fourth award to a purchaser of one or more of said products from said individual member registry, said fourth award being monetary.

7. A method as in claim 1 wherein said one or more database access keys comprise gift registry identification cards.

8. A method as in claim 7 wherein each of said gift registry identification cards includes one or more of a unique optically-readable pattern, a unique electronically readable magnetic code, and a unique radio frequency identification signal.

9. A method as in claim 7 wherein said gift registry identification cards are compatible with a plurality of distinct merchant gift registries.

10. A method as in claim 9 wherein the compatibility is enabled through a database access key conversion protocol.

11. A method as in claim 1 wherein said organization is a fundraising entity.

12. A method as in claim 1 wherein said second award is monetary.

13. A method as in claim 1 wherein said incentive is said first award.

14. A fundraising method, comprising:
(a) providing a database, a computer processor, and a computer terminal communicatively linked to said computer processor and said database;
(b) issuing one or more database access keys to an organization having a plurality of members;
(c) providing an incentive for said one or more members to register with one or more merchant gift registries;
(d) registering with said merchant gift registries by electronically transmitting a registration instruction in a computer readable medium to said computer processor to thereby initialize a respective said access key to record at said database respective member identifying information;
(e) creating respective individual member registries for each of said members, said individual member registries being associated with said one or more merchant gift registries and said respective member identifying information by selecting one or more products for inclusion in said respective individual member registries;
(f) purchasing one or more of said products;
(g) delivering said one or more purchased products to a purchaser; and
(h) awarding a first award to said organization upon registration and creation of at least one of said individual member registries by at least one of said members.

15. A method as in claim 14, including awarding a second award to said one or more members upon registration and creation of a respective individual member registry.

16. A method as in claim 15, including awarding a third award to a recipient upon said purchase, wherein said recipient is selected from the group consisting of said member, said organization, and combinations thereof.

* * * * *